United States Patent
Specht et al.

(10) Patent No.: US 10,055,215 B2
(45) Date of Patent: Aug. 21, 2018

(54) ENABLING CORRECTIONS DURING UPGRADE PROCEDURE

(71) Applicant: SAP SE, Walldorf (DE)

(72) Inventors: Juergen Specht, Gerabronn (DE);
Lars-Eric Biewald, Mannheim (DE);
Thomas Ullrich, Stutensee (DE);
Ralf-Juergen Hauck, Heidelberg (DE);
Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 65 days.

(21) Appl. No.: 15/285,715

(22) Filed: Oct. 5, 2016

(65) Prior Publication Data

US 2018/0095743 A1  Apr. 5, 2018

(51) Int. Cl.
 *G06F 9/44* (2018.01)
 *G06F 8/65* (2018.01)
 *G06F 8/70* (2018.01)

(52) U.S. Cl.
 CPC . *G06F 8/65* (2013.01); *G06F 8/70* (2013.01)

(58) Field of Classification Search
 CPC .................................... G06F 8/65; G06F 8/70
 USPC .................................................. 717/168–173
 See application file for complete search history.

(56) References Cited

U.S. PATENT DOCUMENTS

| | | | |
|---|---|---|---|
| 7,523,142 B2 | 4/2009 | Driesen et al. |
| 7,657,575 B2 | 2/2010 | Eberlein et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,962,920 B2 | 6/2011 | Gabriel et al. |
| 7,971,209 B2 | 6/2011 | Eberlein et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,291,038 B2 | 10/2012 | Driesen |
| 8,301,610 B2 | 10/2012 | Driesen et al. |
| 8,356,010 B2 | 1/2013 | Driesen |
| 8,375,130 B2 | 2/2013 | Eberlein et al. |
| 8,380,667 B2 | 2/2013 | Driesen |
| 8,402,086 B2 | 3/2013 | Driesen et al. |

(Continued)

OTHER PUBLICATIONS

Cisco Systems, "Software Installation and Upgrade Procedures for the RP and RSP7000, 7100, 7200, 7300, 7400, 7500, 7600, 10000 (ESR), 12000, uBR71XX, uBR72XX, and uBR10000", 2006, Cisco Systems, Inc., 10 pages.*

(Continued)

*Primary Examiner* — Ted T Vo
(74) *Attorney, Agent, or Firm* — Fish & Richardson P.C.

(57) ABSTRACT

Methods, systems, and computer-readable storage media for applying corrections during an upgrade procedure of a software management system include actions of receiving a set of white-listed object types, receiving a set of corrections to be imported, the set of corrections including a set of objects, to which corrections are to be applied during the upgrade procedure, determining a set of object types included in the set of corrections, the set of object types including one or more object types, and selectively permitting one or more transport requests to effect corrections of the set of corrections to be issued during the upgrade procedure based on the set of object types and the set of white-listed object types.

20 Claims, 7 Drawing Sheets

(56) References Cited

U.S. PATENT DOCUMENTS

| | | |
|---|---|---|
| 8,407,297 B2 | 3/2013 | Schmidt-Karaca et al. |
| 8,434,060 B2 | 4/2013 | Driesen et al. |
| 8,392,573 B2 | 5/2013 | Lehr et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 9,430,564 B2 * | 8/2016 | Ahuja ............... G06F 17/30713 |
| 2010/0153341 A1 | 6/2010 | Driesen et al. |
| 2014/0359594 A1 | 12/2014 | Erbe et al. |
| 2015/0113520 A1 * | 4/2015 | Kotani ................... G06F 8/665 |
| | | 717/172 |

OTHER PUBLICATIONS

David Benovsky, "Upgrading and hotfixing an instance", 2014, retrieved from https://docs.kentico.com/k9/external-utilities/kentico-hotfix-and-upgrade-utility/upgrading-and-hotfixing-an-instance, 5 pages.*

Biewald, Lars-Eric et al.; U.S. Appl. No. 14/852,119, filed Sep. 11, 2015, entitled: "*Precision Locking a Database Server During the Upgrade of a System Landscape*", 24 pages.

Biewald, Lars-Eric et al.: "*Enabling Emergency Corrections during Upgrade: Soft Lock_EU*", Feb. 2, 2016; SAP SE Internal, Walldorf, Germany, 13 pages.

* cited by examiner

ENABLING CORRECTIONS DURING UPGRADE PROCEDURE

BACKGROUND

Entities, such as software developers and/or vendors, provide software and services. Example software can include enterprise software. In some examples, enterprise software can include application software (an application) that interacts with one or more databases. For example, an application can be hosted on one or more application servers and a user can interact with the application using a client device. In some examples, user interaction can result in data being read from, written to, and/or modified within one or more databases.

Software can be developed in a multi-environment landscape (system) that can include, for example, multiple management tools. Example management tools can include, without limitation, a development system, a test system, and a production system. In some examples, an application is created and/or edited (e.g., configured) using the development system, and is tested using the test system. If the result of the test(s) is satisfactory, the application (or new configuration) can be loaded into the production system for use by users in a live setting.

Management tools can undergo one or more maintenance operations. Example maintenance operations include upgrading, configuring, patching, and testing. For example, if a new version of the management tools is created, each system within the landscape is sequentially upgraded to the new version during an upgrade procedure. During the upgrade procedure, changes to the system can be restricted to maintain persistency in data (e.g., data stored in a database, which the system interacts with). This is because changes made to a system while the system is undergoing an upgrade procedure are sometimes not migrated over to the upgraded system. This can result in, for example, data loss, data corruption, or unexpected behavior. To restrict changes from being made during an upgrade, the system is locked. While the system is locked there is a period of downtime, during which correction, customization, and/or development is blocked.

SUMMARY

Implementations of the present disclosure include computer-implemented methods for corrections to be applied during upgrade procedures. In some implementations, actions include receiving a set of white-listed object types, receiving a set of corrections to be imported, the set of corrections including a set of objects, to which corrections are to be applied during the upgrade procedure, determining a set of object types included in the set of corrections, the set of object types including one or more object types, and selectively permitting one or more transport requests to effect corrections of the set of corrections to be issued during the upgrade procedure based on the set of object types and the set of white-listed object types. Other implementations of this aspect include corresponding systems, apparatus, and computer programs, configured to perform the actions of the methods, encoded on computer storage devices.

These and other implementations can each optionally include one or more of the following features: selectively permitting one or more transport requests includes determining that a correction in a set of corrections includes an object having an object type that is included in the set of white-listed object types, and in response, permitting a transport request to effect the correction; selectively permitting one or more transport requests to effect corrections of the set of corrections is performed in response to determining that a soft repository lock is active; the soft repository lock is active in response to user input indicating that the soft repository lock is to be used during the upgrade procedure; a correction in the set of corrections includes only objects having object types in a set of white-listed object types; only objects having object types in the set of white-listed object types are permitted to be added to the correction; and a transport request is permitted and affects at least one correction is a shadow repository.

Implementations of the present disclosure provide one or more of the following example advantages. In some examples, implementations of the present disclosure enable changes to software and/or data to be made in systems that are being prepared for a relatively longer running upgrade, or are in the process of a relatively longer running upgrade. In some examples, implementations of the present disclosure enable users of the system to deploy required corrections, even if the upgrade procedure deploying new software is already running and has locked the system. In some examples, production operation of a software system can require immediate reaction in case of errors, which can include deploying new software version or content version. Typically, the change procedures are serialized, one can start only when no other change procedure is running. In view of this, implementations of the present disclosure enable the deployment of small changes, even if the system is undergoing a large change. Users can thus react immediately to error situations, which can increase system availability and system performance. Further, implementations of the present disclosure do not require additional hardware resources in the database in terms of additionally cloned tables, the required overhead in runtime is minimized.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to applying corrections during upgrade procedures of software management systems. More particularly, implementations of the present disclosure are directed to using a soft repository lock to selectively apply corrections to systems undergoing an upgrade procedure. In some implementations, actions include receiving a set of white-listed object types, receiving a set of corrections to be imported, the set of corrections comprising a set of objects, to which corrections are to be applied during the upgrade procedure, determining a set of object types included in the set of corrections, the set of object types comprising one or more object types, and selectively permitting one or more transport requests to effect corrections of the set of corrections to be issued during the upgrade procedure based on the set of object types and the set of white-listed object types.

Figure 1:
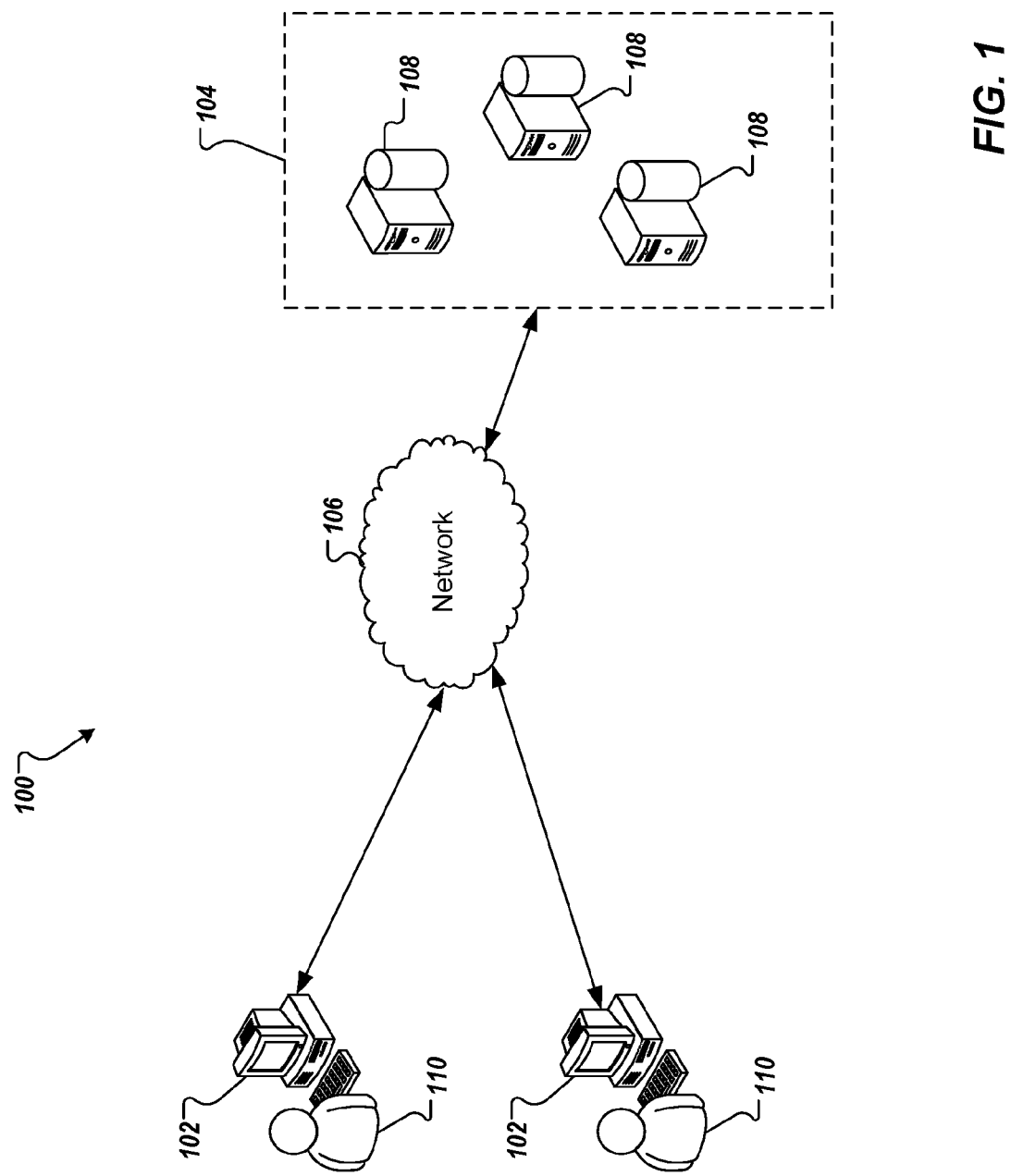
FIG. 1 depicts an example high-level architecture in accordance with implementations of the present disclosure.

FIG. 1 depicts an example architecture 100 in accordance with implementations of the present disclosure. In the depicted example, the example architecture 100 includes one or more client devices 102, a server system 104 and a network 106. The server system 104 includes one or more server devices 108. In the depicted example, respective users 110 interact with the client devices 102. In an example context, a user 108 can include a user, who interacts with an application that is hosted by the server system 104. In another example context, a user 108 can include a user, who interacts with the server system 104 to perform one or more maintenance procedures, described in further detail herein.

In some examples, the client devices 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client devices 102) over the network 106.

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)) over a memory bus. An in-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases.

Implementations of the present disclosure are described in further detail herein with reference to an example context. The example context includes applications that are executed on a client-server architecture, such as the example architecture 100 of FIG. 1. In some examples, applications can be provided in a suite that includes two or more applications. Example applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context.

Referring again to FIG. 1, and in the example context, one or more applications can be hosted by the server system 104. A user 110 can interact with an application using the client device 102. More specifically, a session can be established between the client device 102 and one or more server devices 104, during which session the user 110 is able to interact with one or more applications hosted on the server system 104. The one or more applications can enable the user to interact with data stored in one or more databases. In some examples, interactions can result in data being stored to the database, deleted from the database, and/or edited within the database.

In some implementations, one or more software management tools (provided as one or more computer-executable programs) are provided in a multiple environment landscape, which can be used to create and/or effect changes in applications. In some examples, the software management tools undergo lifecycle management, which can include executing one or more maintenance procedures. Example maintenance procedures can include an upgrade procedure, a patch procedure, a configuration procedure, and development and testing procedures. Implementations of the present disclosure will be described in further detail herein with reference to an upgrade procedure. An example upgrade procedure can include updating the software management tools. For example, an update can include updating from a first version (e.g., V1), also referred to as a start-release, to a second version (e.g., V2), also referred to as a target-release. Example updates can include changing a configuration, adding functionality, and/or structural changes to one or more tables stored in one or more databases.

In some examples, the execution of maintenance procedures can pose technical challenges. For example, users may depend on the availability of the software management tools to effect changes (e.g., corrections) to an application and/or a database, including the applications and data stored therein. In some examples, the required availability of a database may dictate that interruptions to productive operation be minimized when performing an upgrade. That is, for example, extended database interruptions may be unacceptable and minimizing the downtime for a database can become problematic. As another example, a database system may require that certain modifications, add-ons, support packages, application data, customizing data, and/or other items be maintained when installing the target release of the software management tools. Making adjustments to import or maintain such items can extend the downtime required for performing an upgrade procedure, and, in some examples, create failure or disaster risks for the database.

In some examples, a system undergoes an upgrade procedure (e.g., from a start-release to a target release) in a landscape that includes multiple environments (e.g., software management tools) used to create and/or effect changes in one or more applications and/or database systems. Example software management tools include a development environment (also referred to herein as a development system), a test environment (also referred to herein as a test system), and a production environment (also referred to herein as a production system). In some examples, each system includes respective software and/or hardware that enables developers to perform functionality during the upgrade procedure (e.g., edit a configuration of the software, test newly configured software, put newly configured software into production).

Figure 2:
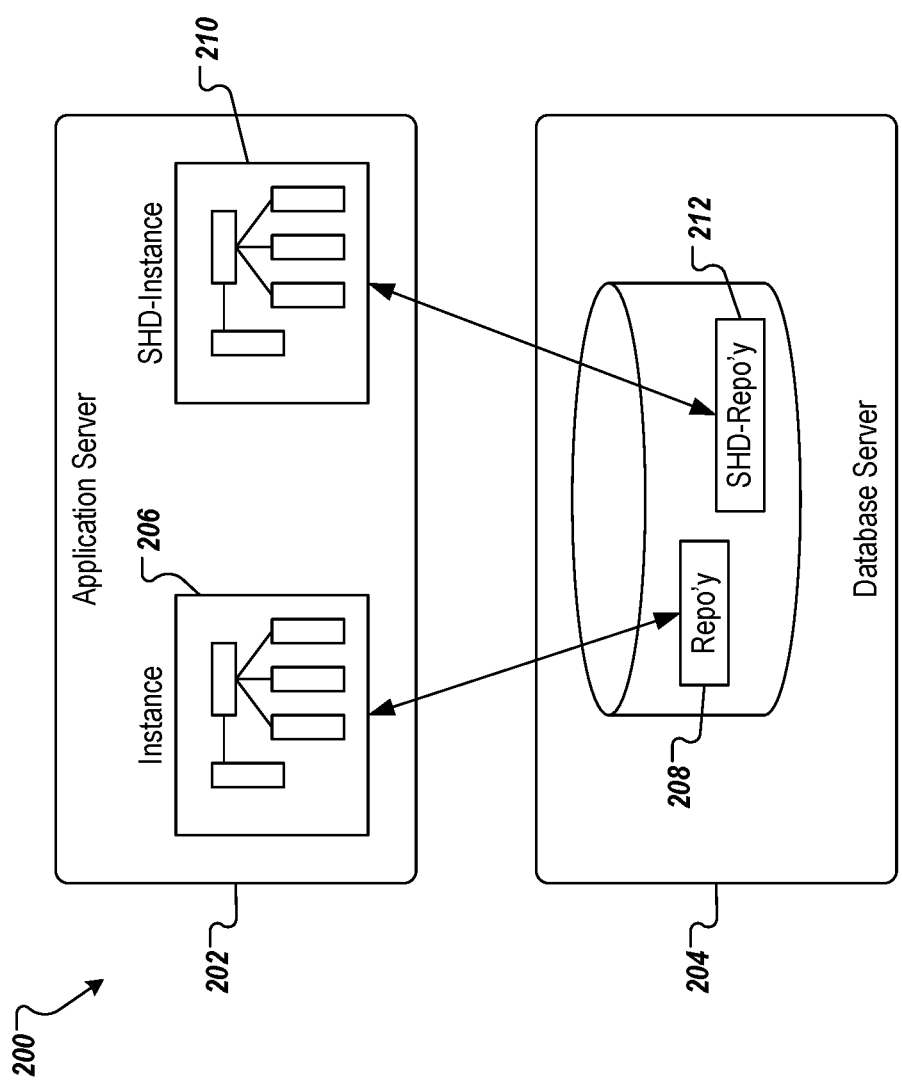
FIG. 2 depicts an example shadow system.

In some examples, to address one or more technical challenges, an example upgrade procedure can include providing a so-called shadow system, which can include a shadow application instance, and a shadow repository, where the upgrade is implemented on the shadow system, while the production system continues to operate. FIG. 2 depicts an example shadow system 200. In the example of FIG. 2, an application server 202, and a database server 204 (e.g., provided by one or more of the server systems 104 of FIG. 1). The application server 202 provides an application instance 206, and the database server 204 provides a repository 208 (e.g., storing one or more tables accessed by the application instance 206). In accordance with the example upgrade procedure, the application server 202 provides a shadow (SHD) application instance 210, and a shadow repository 212. Implementations of the example upgrade procedure are described in further detail in commonly assigned U.S. Pat. No. 8,479,187, the disclosure of which is expressly incorporated herein by reference in the entirety for all purposes. In some examples, during the upgrade procedure, changes are implemented on the shadow system (e.g., tables in the shadow repository are updated to a new software level (target release)). In some examples, after the upgrade procedure is executed, the shadow system is brought online as the production system during a period of downtime.

In some examples, a transport lock (LOCK_TR) and a repository lock (LOCK_EU) are implemented at the outset of the upgrade procedure. In some examples, the transport lock prevents transport requests from being executed in the production system. In some examples, a transport request can include changes that are to be made to a system. In some examples, the repository lock prevents changes to be made to the repository in the production system.

Figure 3:
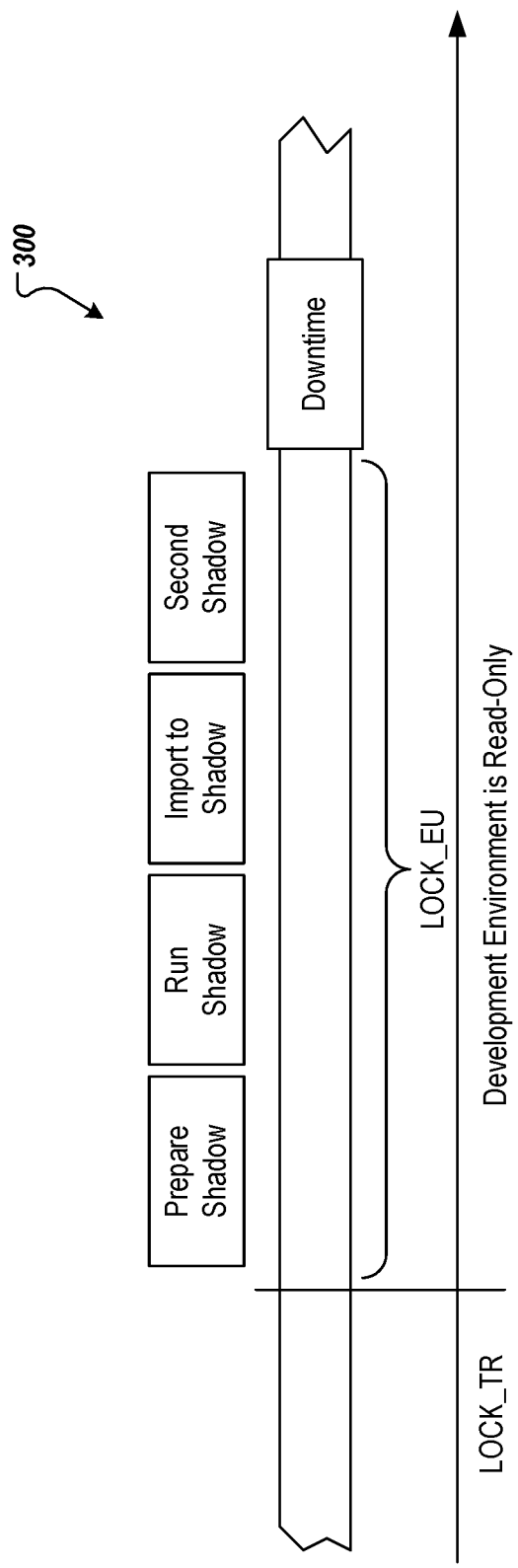
FIG. 3 depicts an example timeline of an example upgrade procedure.

FIG. 3 depicts an example timeline of an example upgrade procedure 300.

As noted above, during the upgrade procedure, the repository is locked (e.g., LOCK_EU). In some examples, locking of the repository occurs before the shadow repository is created, or before analysis of the repository for objects to be transferred to the target system in the load upgrade. As increasingly more activities are loaded into the shadow system, the duration of the transport lock can become increasingly longer (e.g., a week or more). During this period, no corrections can be imported to production. This can be problematic for a user, if the user needs to make a correction. In such a case, during a traditional upgrade procedure, a note can be input into the development system, and transported to the resulting production system (e.g., the shadow system brought online as the production system), where customizing would be adjusted and/or custom code would be changed and transported to provide the correction.

In view of the context provided above, implementations of the present disclosure enable corrections to be applied during an upgrade procedure. In some implementations, and as described in further detail herein, one or more corrections to a set of object types, which do not significantly impact the preparation of the target system significantly, can be made. In some examples, this set of object types is enforced in the corresponding development system. In this manner, only uptime-enabled changes are created, which can be deployed after the upgrade procedure. In some implementations, changes are deployed only to tables having a respective shadow table, and the content is replicated between original table and shadow table. In some examples, to create a consistent picture of the content deployed to the original table, a parallel deployment of the parts which go to shadow tables is provided. In some examples, this parallel deployment includes records being deployed to the target release by the target release development system to avoid overwriting target release software with start-release artifacts. In some implementations, each change performed in the start-release development system is duplicated into the target release development system, and is adjusted to the target release. In this manner, all functional changes deployed to the source are also contained in the target, and the target works correctly and consistently in a new version.

In some implementations, and as described herein, the set of object types, to which one or more corrections (e.g., changes) can be made include so-called white-listed object types. In some examples, the white-listed object types include those object types, which can be handled by the upgrade procedure, and which do not disturb the upgrade procedure. In some examples, the start-release development system can be set to a correction mode, which enables the addition of white-listed object types on transports. These transports can be imported, while the repository lock is in effect. Accordingly, the repository lock can be referred to as a soft repository lock (e.g., soft LOCK_EU). In some examples, a soft repository lock can be described as a repository lock that allows some changes (e.g., corrections) to be made to the repository, while blocking other changes.

Figure 4:
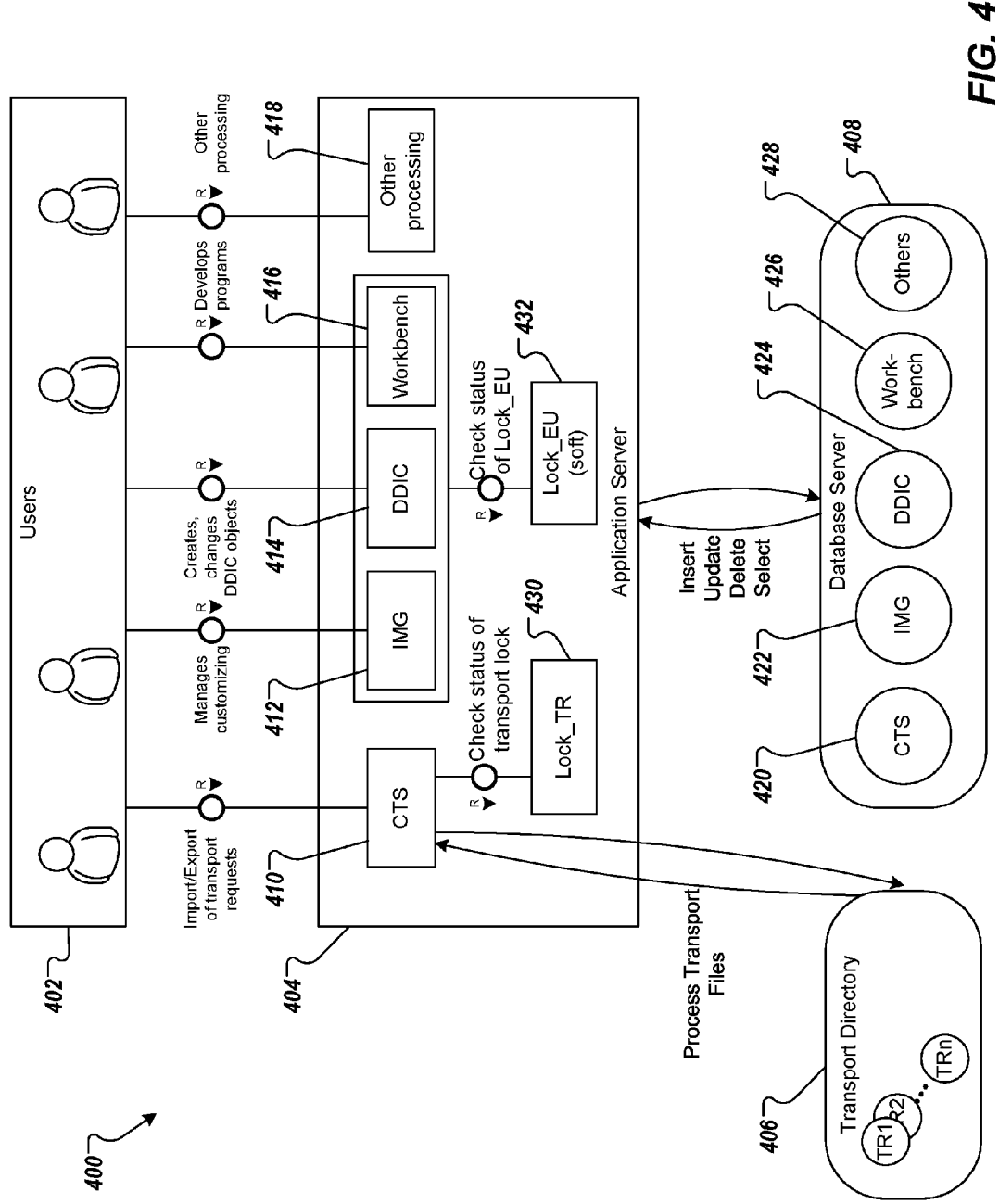
FIG. 4 depicts an example architecture for executing an upgrade procedure.

FIG. 4 depicts an example architecture 400 for executing an upgrade procedure. In the depicted example, the architecture 400 includes users 402 (e.g., programmers, testers, administrators), an application server 404, a transport directory 406, and a database server 408 (e.g., hosting one or more databases). In some examples, one or more user 402 can transmit requests to the application server 404 (e.g., using respective systems (development, test, production)). In some examples, different types of requests can be handled by different components within the application server 404. In the depicted example, the application server 404 includes change and transport system (CTS) 410 configured to process transport requests to transport content from one system to another system. In some examples, a user of the development system can generate a transport request to migrate a change in content from the development system to the test system. For example, the change in content can be a change to a report or a database table. The change can also be subsequently migrated from the test system to the production system. In some examples, the CTS 410 can process transport requests and store the transport requests within the transport directory 406. In some examples, the transport directory 406 is a container to store changes (e.g., data logs, files, and variables) so that the change can be transferred or migrated from one system to another. For example, a development system can export changes into the transport directory 406 as a transport request. The test system and/or the production system can import the changes from the transport directory by analyzing the stored transport request(s).

In the depicted example, the application server 404 further includes an implementation guide (IMG) 410. In some examples, the IMG 410 is a tool that is used to adjust a configuration. In some examples, system requirements can be adjusted using the IMG 412. In the depicted example, requests to manage customization from a user can be routed by the application server 404 to the IMG 410 for processing. In the depicted example, the application server 404 further includes a data dictionary (DDIC) 414. In some examples, the DDIC 414 is a tool configured to describe and manage data definitions. For example, the DDIC 414 can provide definitions for the structure of database objects (e.g., tables, indices, and views, types, domains, search helps, and lock objects). In some examples, the DDIC 414 can support user-defined types. In the depicted example, the application server 404 further includes a workbench 416. In some examples, the workbench 416 is a collection of tools used to develop, test, and run application programs. For example, users can communicate with the workbench 416 to create application programs, which can be executed within the application server 404. In some implementations, the application server 404 can also include one or more other components 418 to support other processing.

In some implementations, one or more components within the application server 404 can communicate with the database server 408 (e.g., for inserting, updating, deleting, selecting content stored within a database). In some examples, the database 408 stores CTS data 420, which is utilized by the CTS 410, IMG data 422, which is utilized by the IMG 412, DDIC data 424, which is utilized by DDIC 414, workbench data 426, which is utilized by the workbench 416, and other data 428, which is utilized by other processing component(s) 418.

In some examples, an upgrade procedure can be performed to fix bugs, add functionality, and otherwise improve one or more components of the architecture 400. In some examples, an upgrade strategy can be provided, which includes the application server 404 entering a restricted mode at some point during the upgrade procedure. In some examples, while in the restricted mode, the application server 404 blocks particular user requests, as described in further detail herein. This ensures that respective, particular types of data within the database server 408 remains persistent before and after the upgrade procedure.

In some implementations, and as introduced above, the application server 404 includes a transport lock 430 and a soft repository lock 432. In some examples, the transport lock 430 is configured to control access of the CTS 410 to the CTS data 420 within the database server 428. In some examples, when the transport lock 430 is set, the CTS 410 is unable to transmit transport requests to the database server 408. Consequently, a transport request can be returned to the user with an error. When the transport lock 430 is released, the CTS 410 is able to access data within the database server 408. In some implementations, and as described in further detail herein, the soft repository lock 432 is configured to control access of the IMG 412, the DDIC 414, and/or the workbench 416 to data within the database server 408. In some examples, when the soft repository lock 432 is set, particular types of data within the database server 408 are inaccessible.

In some examples, when application server 404 receives an import/export transport request, the transport request gets routed to the CTS 410. The CTS 410 can check the status of transport lock 430. If transport lock 430 is set (active), the CTS 410 is unable to complete the transport request. If the transport lock 430 is released (inactive), the CTS 410 performs the transport request by generating a statement (e.g., SQL statement), and transmitting the statement to the database server 408. The database server 408 processes the statement, and returns requested content. The transport request can be stored within transport repository 406. In some examples, one or more of the IMG 412, the DDIC 414, and the workbench 416 can check the status of the repository lock 432 prior to performing a user request. In some examples, requests to configure the architecture 400, create/change certain types of objects, and/or develop application programs can be rejected when the repository lock 432 is set (active), or can be accepted when the repository lock 432 is released (inactive). Accordingly, the application server 404 utilizes the transport lock 430, and the repository lock 432 to control access to the database server 408 during the upgrade procedure.

In accordance with implementations of the present disclosure, when the upgrade procedure is started in the production system, and institution of the soft repository lock is close, the development system is switched to a correction mode. In some examples, all released changes before this point in time are still not compliant with the correction mode, and these changes are to be deployed to the production system before the soft repository lock is active. In this manner, all subsequent changes done in development system, which are compliant with the correction mode, can actually be deployed to the production system, because no undeployable pre-requisite exists. In some implementations, while in the correction mode, only compliant changes are performed. In this manner, if a change requires another change for deployment, for example, the other change can also be deployed, because it is compliant and all its required changes are compliant as well.

In some examples, a change created in the development system can span several tables at deployment, and content may be written to and/or deleted from several tables. The target tables of the deployment are cloned during the time period, while the soft repository lock is active. Such table cloning, however, does not guarantee transactional consistency between the tables. Consequently, it is possible to have partially deployed artifacts in the shadow tables. In some implementations, and to ensure the objects are consistently part of the shadow tables, the objects are to be deployed to the shadow tables as well (at least the part of the objects, for which a shadow table exists).

In some implementations, the objects are deployed as a new version, created in the target release development system to the shadow tables. In some examples, a deployment sequence is specified (e.g., first the start-release version of the objects, then the target release version of the objects). In some examples, a collision prevention mechanism is implemented, whereby each object being deployed from the target release, is shall not overwritten by the start-release version.

In some implementations, during the upgrade procedure, multiple development system are available in the landscape of a single production system (e.g., the development system on the start-release, which is still required to create emergency changes for the start-release, and the target release development system, which is required to do the modification adjustment, delta customizing and custom development reaction to changes in the platform plus potential custom individual development). In some implementations, each change performed in the start-release development system is also performed in the target release development system.

Figure 5:
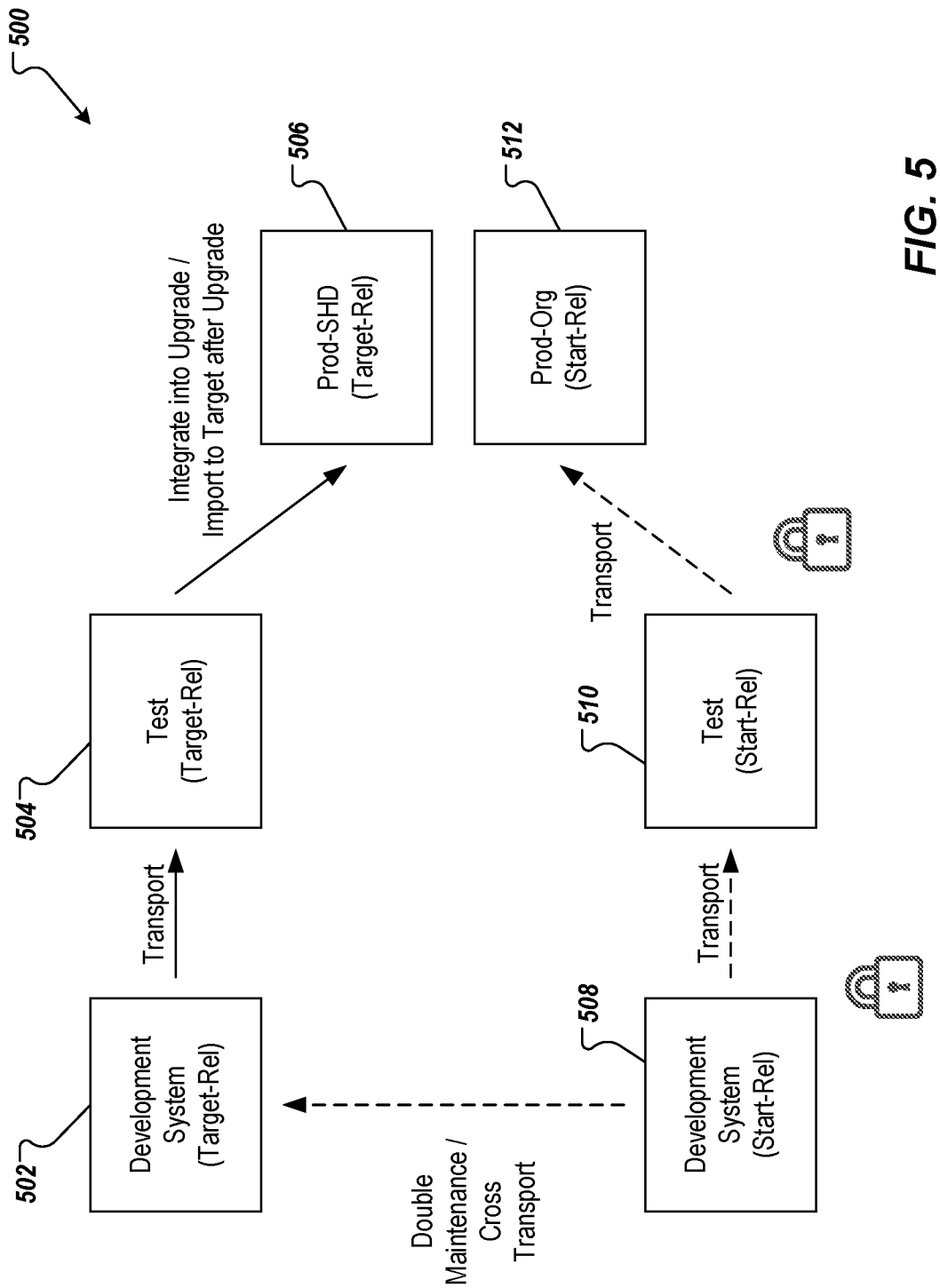
FIG. 5 depicts an example transport landscape during an upgrade procedure.

FIG. 5 schematically depicts an example transport landscape 500 during an upgrade procedure. In the depicted example, the transport landscape 500 includes a development system 502, a test system 504, and a production system 506, each operating in the start-release. In the depicted example, the transport landscape 500 also includes a development system 508, a test system 510, and a production system 512, each operating in the target-release. In some examples, the production system 512 is provided as a shadow system, described herein.

FIG. 5 depicts a typical way to handle the transport landscape 500 during an upgrade procedure, whereby the development system 502 and the test system 504 are first upgraded to the target-release. In this manner, any custom code and/or customizing can be adjusted to the target-release. The released transports, however, cannot be imported to the production system 506, until the production system 506 is upgraded to the target-release as well. For example, transports (e.g., for dictionary objects (SPDD), for repository objects (SPAU)) created in the target-release systems have to be integrated into the production system upgrade (e.g., the production system 512).

In some implementations, a correction system executes on the start-release. In some examples, released transports are imported into the production system before the upgrade. In some implementations, a plug-in is provided to handle the correction process during the upgrade procedure, while the soft repository lock is active. In some examples, as the correction system is set up, full development is possible using the development system. At a later point in time (e.g., when the production system enters the upgrade preparation), the correction system is set to the correction mode. In some examples, the correction system can use the transport route to find the production system, and request a state of the production system. Once preparation of the upgrade procedure is started, the correction system can be set to the correction mode, all open transports can be released, and all released transports can be imported to the production system. In some implementations, any follow-up transports are created as described herein, and can be imported, while the soft repository lock is active.

In some implementations, the development system executes on the target-release, and the development system and the test system are upgraded before the production system. In some examples, transports released in this landscape are collected and imported into the production system after the upgrade procedure. In some examples, transports are released during the upgrade procedure, for example, if the transports are added to the upgrade procedure. In some examples, a transport buffer (e.g., provided by the CTS 410) is used to collect the target-release transports. In some examples, the transport buffer is separate from a buffer of the correction landscape, which buffer is used to import to the production system before the upgrade. Accordingly, multiple transport buffers can be used during the upgrade procedure (e.g., a transport buffer for the start-release transport requests, a transport buffer for the target-release transport request).

In some examples, users that use the development system may do a relatively limited amount of development activity. In such instances, the development system is first upgraded from the start-release to the target release, and the test system operates as a correction system. In some examples, transport requests of the development system are queued for import to the production system, after the production system is upgraded. In some examples, transport requests of the test system can be imported to the production system before the upgrade. Accordingly, and in instances where the test system operates as the correction system, the test system conducts checks of the white-list, which are described in further detail herein.

In some examples, corrections can be deployed using support packages, and/or correction transports. A support package is provided based on one or more notes defining corrections that are to be applied. In some examples, a correction deployed using a support package, or a correction transport may not be deployable to both the start-release and the target-release. Consequently, it can occur that a correction applied to the start-release needs to be applied in another version to the target-release. Such corrections can be implemented in the development system of the target-release. Accordingly, the corrections are added to transports and are released for import to the production system on the target-release. Because support packages can contain correction instructions for multiple releases, the correction required for the target-release can be computed, after the correction is applied to the start-release. In some examples, sets of support packages applied to the start-release can be compared to respective sets of support packages in the target-release to automatically identify any missing corrections. In some examples, a process to maintain support packages can be automated, and the risk that corrections are lost can be minimized by either exporting a list of support package and uploading the list to the development system, or using direct remote function call (RFC) communication.

In some examples, custom code and customizing may be better supported in the target-release. In such cases, the transport requests can be applied to the target-release of the development system. In some examples, for notes being deployed to the start-release of the development system, the corresponding correction instruction for the target-release can also be provided in notes. For example, a report can be provided and can be executed the target-release development system to verify, whether all corrections which had been applied using notes on the start-release have also been applied with an appropriate correction on the target-release.

In some implementations, and as introduced above, the soft repository lock can use a white-list of object types that are able to be transported into the start-release production system, while the soft repository lock is set (active). In some examples, object types included in the white-list are those object types having changes that can be handled by the upgrade procedure. In some examples, object types included in the white-list are code like objects (reports, classes, UI) that do not alter table structures. Example object types included in the white-list include, without limitation, table content (TABU), values for single rows or fields in a database table (view cluster maintenance data (CDAT), table data (TDAT), view maintenance data (VDAT)), object spanning different tables (TLOGO) without object specific post-processing (after import method, AIM), and, in some circumstances, TLOGO with object specific post-processing. In some examples, an AIM is executed after an object is imported into a production system to activate and integrate the object into the production system. Example object types that are not included in the white-list (e.g., so-called black-listed object types) include, without limitation, all DDIC object types that result in changes to the database structure (e.g., data element definitions (DTEL), data domain definitions (DOMA), table structure definitions (TABL)), switch transport objects generating code or table structures, additional database object definitions (HTA, HTC), and, in some circumstances, TLOGO with AIM (e.g., AIM with DDIC generation).

In accordance with implementations of the present disclosure, any object type that is not a white-listed object type is prevented from being added to a transport. In some examples, a check can be implemented in a workbench organizer (WBO) or integrated development infrastructure (IDE) or customizing editors, which can be used to add objects to transports. In some examples, a check can be included in the transport release (TR_RELEASE*), because not all objects are added through WBO to transports. For example, objects can also be added using the transport interface. In accordance with implementations of the present disclosure, transports that are to be added into the start-release production system are created with only white-listed objects.

In some implementations, transports can be managed be a transport control program (TCP, a tool to deploy single objects or a set of objects into a system). In some examples, a CTS (e.g., the CTS 410 of FIG. 4) can call the TCP. In some examples, a software upgrade manager (SUM) can call the TCP. In some implementations, if a transport request is received, the TCP determines whether the soft repository lock is active. If the soft repository lock is active, the TCP checks the content of the transport request. For example, the TCP compares object types of objects in the transport request to the set of white-listed object types. In some implementations, the set of white-listed object types is maintained in a single location, and is accessible by one or more components (e.g., the TCP, the WBO). In some examples, if one or more object types in the transport request are not white-listed object types, the transport request is blocked. In some examples, if the object types of all objects in the transport request are white-listed object types, the transport request is executed in the production system.

In some implementations, a transport request can be created in a correction system, which is monitored to ensure that all object types implicated in the transport request are white-listed object types. In some examples, the transport request can include a maintenance flag indicating that all object types in the transport request are white-listed object types. Consequently, the transport request need not be checked upon import of the transport request to the production system. For example, the object types of the objects in the transport request need not be compared to the white-listed object types upon import of the transport request.

In some implementations, the upgrade procedure includes multiple phases. Initially, it can be determined as to whether the soft repository lock is to be used for the upgrade procedure. For example, an upgrade system (e.g., the SUM) can request whether a user (e.g., administrator executing the upgrade procedure) would like to use the soft repository lock. If the user indicates that the soft repository lock is not to be used, the upgrade procedure can proceed in a traditional manner (e.g., such as disclosed in commonly assigned U.S. application Ser. No. 14/852,119, filed on Sep. 11, 2015, the disclosure of which is expressly incorporated herein by reference for all purposes). If the user indicates that the soft repository lock is to be used, the upgrade procedure proceeds as described herein.

Example phases can include, without limitation, system preparation (checking system for upgrade pre-requisites) and defining the target software components versions, cloning the repository tables for deployment of the new software to the clone tables, cloning the customizing tables for deployment of the new customizing to the clone tables, start of downtime, start of online data migration, cutover to the target version and end of downtime.

In some examples, one or more tables are copied, where a copy of a table is created, and is used to deploy the target software and content. In some examples, the copy tables can include tables storing the software repository or customizing (e.g., see FIG. 2) in one or more phases of the upgrade procedure. In some examples, import of transport requests is enabled during these phases and the upgrade ensures a consistent transfer to the target-release. In some phases of the upgrade procedure, the production repository is analyzed and/or copied, and a parallel import can lead to inconsistent set of objects in the target-release. In some examples, copying of a production repository to a shadow repository is performed table-by-table. Consequently, a transport object imported into several tables can result in the object being only partially copied. In some examples, the repository is analyzed for the presence of particular objects. Depending on the time of the import of the particular object, the object might or might not be found in the repository.

In some examples, customizing tables are copied, the copy process being extended by the use of database triggers, which transfer customer changes to the table content after the copy process. In such examples, and during a standard upgrade procedure, if a trigger fires (e.g., in the case of an emergency import), the table will be imported in downtime, and the shadow table is dropped. In such examples, and during a zero downtime maintenance (ZDM) upgrade procedure, an import in the shadow table defines a collision pattern, where one or more triggers on the original production table read the collision pattern, and changed data (e.g., in the case of an emergency import) is checked against the collision pattern. If there is a collision, the data is not replicated.

Implementations of the present disclosure include multiple options for importing corrections. In a first example (Option 1: Import Only—no Takeover), corrections are imported into the target-release production system (e.g., not imported into the shadow system). In some examples, a transport for the target-release production system is created in the target-release landscape, and is added to the upgrade import buffer, or is imported after the upgrade procedure is complete. In a second example (Option 2: Import and (partial) Takeover), imported corrections only replace particular object types instead of all object types accounted for in the corrections (partial takeover). In some examples, customized objects (e.g., customer objects) are replaced. In this manner, consistent behavior of imported corrections is achieved, regardless of at which point in time the import occurs.

Figure 6:
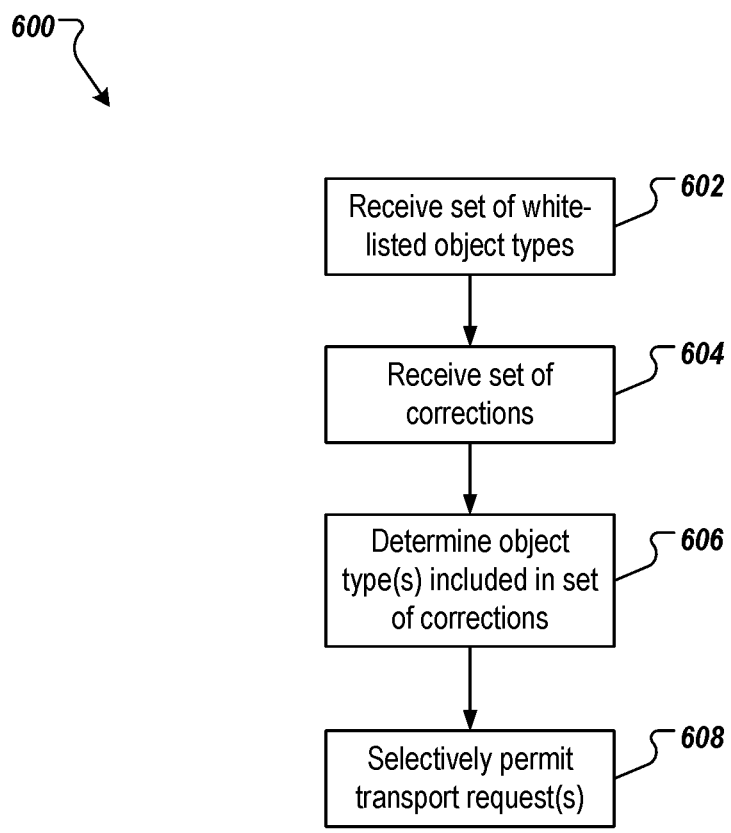
FIG. 6 depicts an example process that can be executed in accordance with implementations of the present disclosure.

FIG. 6 depicts an example process 600 that can be executed in accordance with implementations of the present disclosure. In some examples, the example process 600 can be provided by one or more computer-executable programs executed using one or more computing devices. In some examples, the example process 600 is executed to apply corrections during an upgrade procedure of a software management system.

A set of white-listed object types is received (602). For example, a TCP can receive the set of white-listed object types from computer-readable memory. A set of corrections to be imported is received (604). For example, the TCP can receive the set of corrections to be imported from computer-readable memory. In some examples, the set of corrections include a set of objects, to which corrections are to be applied during the upgrade procedure. A set of object types included in the set of corrections is determined (606). For example, the TCP can review the set of objects and determine, for each object, a respective object type. In some examples, the object type can be recorded in metadata that is associated with the respective objects. In some examples, the set of object types includes one or more object types. One or more transport requests are selectively permitted to effect corrections of the set of corrections to be issued during the upgrade procedure (608). In some examples, the one or more transport requests are selectively permitted based on the set of object types and the set of white-listed object types. For example, the TCP compares object types of objects in the transport request to the set of white-listed object types. In some examples, a transport request is permitted for at least one object type that is included in the set of white-listed object types.

As discussed herein, implementations of the present disclosure ensure that, from the point of the upgrade runs on the production system, developers in a development or test or customizing system can create changes, which can later be deployed to the production system, even when the upgrade is running. In some examples, the change is handled consistently in the system, ensuring the change is also applied to the target software and configuration being deployed, if required. Implementations of the present disclosure also ensure that changes to objects residing in more than one database table are handled consistently during the upgrade. In this manner, the object is changed in all database tables, or in none in the target system. Implementations of the present disclosure also enable administrators to react to an error in the production system by deploying a change created by a developer. In this manner, errors can be resolved even when an upgrade is running, and switching production to a new version days or hours later, thus minimizing the system outage.

Implementations of the present disclosure provide one or more of the following example advantages. In some examples, implementations of the present disclosure enable changes to software and/or data to be made in systems that are being prepared for a relatively longer running upgrade, or are in the process of a relatively longer running upgrade. In some examples, implementations of the present disclosure enable users of the system to deploy required corrections, even if the upgrade procedure deploying new software is already running and has locked the system. In some examples, production operation of a software system can require immediate reaction in case of errors, which can include deploying new software version or content version. Typically, the change procedures are serialized, one can start only when no other change procedure is running. In view of this, implementations of the present disclosure enable the deployment of small changes, even if the system is undergoing a large change. Users can thus react immediately to error situations, which can increase system availability and system performance. Further, implementations of the present disclosure do not require additional hardware resources in the database in terms of additionally cloned tables, the required overhead in runtime is minimized.

Figure 7:
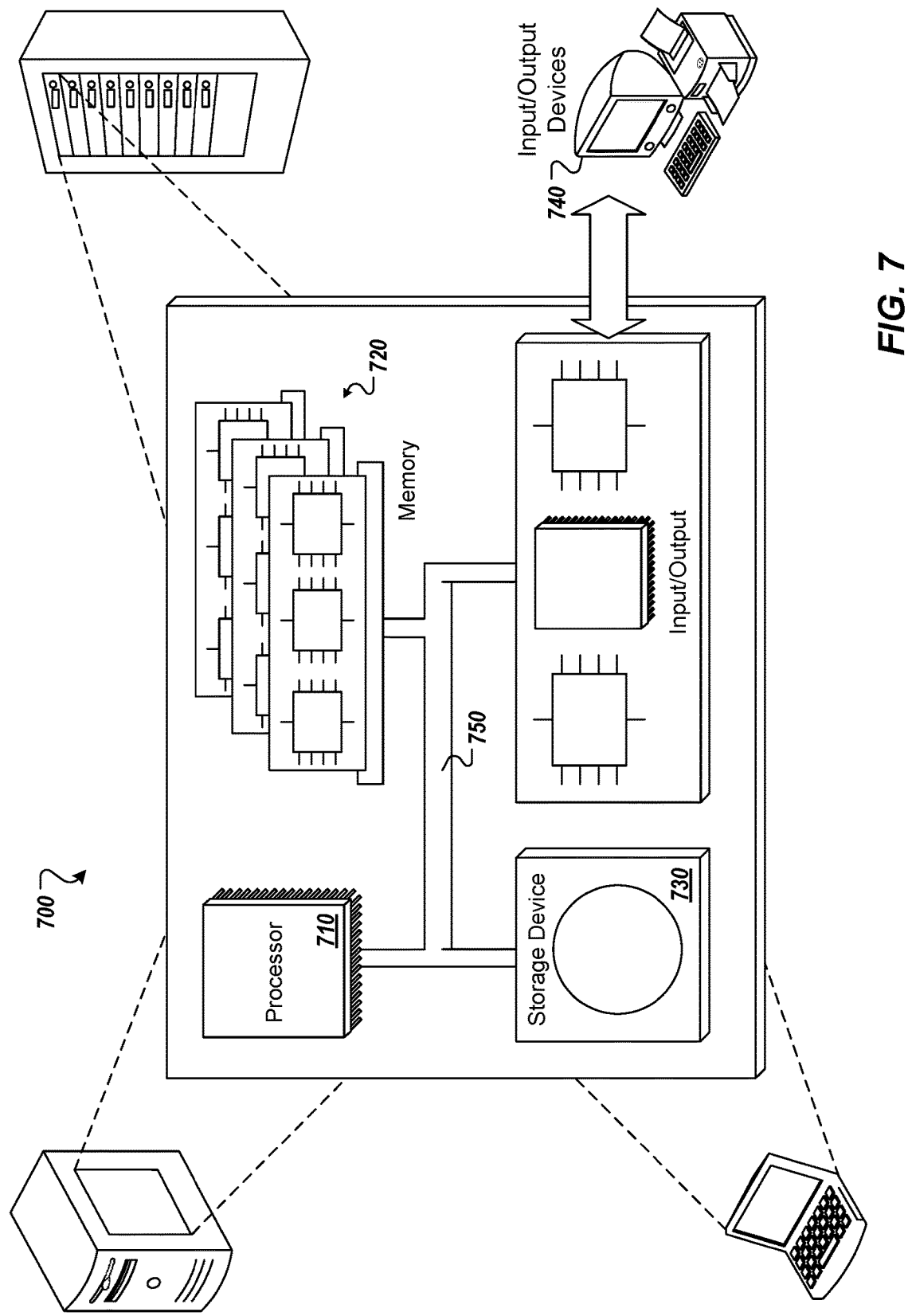
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit. The storage device 730 is capable of providing mass storage for the system 700. In one implementation, the storage device 730 is a computer-readable medium. In various different implementations, the storage device 730 may be a floppy disk device, a hard disk device, an optical disk device, or a tape device. The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device), for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include (e.g., a LAN, a WAN), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for applying corrections during an upgrade procedure of a software management system, the method being executed using one or more processors and comprising:
receiving, by the one or more processors, a set of white-listed object types, each white-listed object type in the set of white-listed object types being permitted to be handled by the upgrade procedure of the software management system and being identified as not disturbing the upgrade procedure of the software management system;
receiving, by the one or more processors, a set of corrections to be imported, the set of corrections comprising a set of objects, to which corrections are to be applied during the upgrade procedure;
determining, by the one or more processors, a set of object types included in the set of corrections, the set of object types comprising one or more object types; and
selectively permitting, by the one or more processors, one or more transport requests to effect corrections of the set of corrections to be issued during the upgrade procedure of the software management system based on the set of object types and the set of white-listed object types to minimize an outage of the software management system.

2. The method of claim 1, wherein selectively permitting one or more transport requests comprises determining that a correction in a set of corrections includes an object having an object type that is included in the set of white-listed object types, and in response, permitting a transport request to effect the correction.

3. The method of claim 1, wherein selectively permitting one or more transport requests to effect corrections of the set of corrections is performed in response to determining that a soft repository lock is active.

4. The method of claim 3, wherein the soft repository lock is active in response to user input indicating that the soft repository lock is to be used during the upgrade procedure.

5. The method of claim 1, wherein a correction in the set of corrections comprises only objects having object types in a set of white-listed object types.

6. The method of claim 5, wherein only objects having object types in the set of white-listed object types are permitted to be added to the correction.

7. The method of claim 1, wherein a transport request is permitted and affects at least one correction is a shadow repository.

8. A non-transitory computer-readable storage medium coupled to one or more processors and having instructions stored thereon which, when executed by the one or more processors, cause the one or more processors to perform operations for applying corrections during an upgrade procedure of a software management system, the operations comprising:
receiving a set of white-listed object types;
receiving a set of white-listed object types, each white-listed object type in the set of white-listed object types being permitted to be handled by the upgrade procedure of the software management system and being identified as not disturbing the upgrade procedure of the software management system;
determining a set of object types included in the set of corrections, the set of object types comprising one or more object types; and
selectively permitting one or more transport requests to effect corrections of the set of corrections to be issued during the upgrade procedure of the software management system based on the set of object types and the set of white-listed object types to minimize an outage of the software management system.

9. The non-transitory computer-readable storage medium of claim 8, wherein selectively permitting one or more transport requests comprises determining that a correction in a set of corrections includes an object having an object type that is included in the set of white-listed object types, and in response, permitting a transport request to effect the correction.

10. The non-transitory computer-readable storage medium of claim 8, wherein selectively permitting one or more transport requests to effect corrections of the set of corrections is performed in response to determining that a soft repository lock is active.

11. The non-transitory computer-readable storage medium of claim 10, wherein the soft repository lock is active in response to user input indicating that the soft repository lock is to be used during the upgrade procedure.

12. The non-transitory computer-readable storage medium of claim 8, wherein a correction in the set of corrections comprises only objects having object types in a set of white-listed object types.

13. The non-transitory computer-readable storage medium of claim 12, wherein only objects having object types in the set of white-listed object types are permitted to be added to the correction.

14. The non-transitory computer-readable storage medium of claim 8, wherein a transport request is permitted and affects at least one correction is a shadow repository.

15. A system, comprising:
a computing device; and
a computer-readable storage device coupled to the computing device and having instructions stored thereon which, when executed by the computing device, cause the computing device to perform operations for applying corrections during an upgrade procedure of a software management system, the operations comprising:
receiving a set of white-listed object types;
receiving a set of white-listed object types, each white-listed object type in the set of white-listed object types being permitted to be handled by the upgrade procedure of the software management system and being identified as not disturbing the upgrade procedure of the software management system;
determining a set of object types included in the set of corrections, the set of object types comprising one or more object types; and
selectively permitting one or more transport requests to effect corrections of the set of corrections to be issued during the upgrade procedure of the software management system based on the set of object types and the set of white-listed object types to minimize an outage of the software management system.

16. The system of claim 15, wherein selectively permitting one or more transport requests comprises determining that a correction in a set of corrections includes an object having an object type that is included in the set of white-listed object types, and in response, permitting a transport request to effect the correction.

17. The system of claim 15, wherein selectively permitting one or more transport requests to effect corrections of the set of corrections is performed in response to determining that a soft repository lock is active.

18. The system of claim 17, wherein the soft repository lock is active in response to user input indicating that the soft repository lock is to be used during the upgrade procedure.

19. The system of claim 15, wherein a correction in the set of corrections comprises only objects having object types in a set of white-listed object types.

20. The system of claim 19, wherein only objects having object types in the set of white-listed object types are permitted to be added to the correction.

* * * * *